United States Patent [19]

Ishii

[11] Patent Number: 4,649,327
[45] Date of Patent: Mar. 10, 1987

[54] ELECTRIC MOTOR CONTROL CIRCUIT

[75] Inventor: Eiichi Ishii, Tokyo, Japan

[73] Assignee: NEC Corporation, Tokyo, Japan

[21] Appl. No.: 730,412

[22] Filed: May 6, 1985

[30] Foreign Application Priority Data

May 10, 1984 [JP] Japan .................................. 59-93143

[51] Int. Cl.$^4$ ............................................... H02P 5/16
[52] U.S. Cl. .................................... 318/310; 318/317; 318/331; 318/318; 318/341
[58] Field of Search ............... 318/310, 311, 312, 314, 318/318, 317, 327, 328, 329, 341, 342, 331, 332, 344, 410, 631, 635

[56] References Cited

U.S. PATENT DOCUMENTS

| 3,343,055 | 9/1967 | Havlicek et al. | 318/341 X |
| 3,475,672 | 10/1969 | Oltendorf | 318/317 X |
| 3,965,405 | 6/1976 | Romano | 318/317 X |
| 4,162,437 | 7/1979 | Keith et al. | 318/391 X |
| 4,168,454 | 9/1979 | Gmeinder | 318/331 |
| 4,206,389 | 6/1980 | Snyder | 318/331 X |
| 4,227,127 | 10/1980 | Fukaya et al. | 318/317 |
| 4,234,835 | 11/1980 | Ota et al. | 318/317 |
| 4,345,189 | 8/1982 | Kukaya et al. | 318/317 |
| 4,450,392 | 5/1984 | Gaslonde | 318/331 X |
| 4,477,752 | 10/1984 | Nakano et al. | 318/331 |

Primary Examiner—William M. Shoop, Jr.
Assistant Examiner—Shik Luen Paul Ip
Attorney, Agent, or Firm—Sughrue, Mion, Zinn, Macpeak, and Seas

[57] ABSTRACT

The motor control circuit is constituted by a current controlling circuit having a first output terminal connected to a source terminal via a resistor, a second output terminal connected to the source terminal through a motor to be controlled, the currents outputted by the first and second output terminals being controlled by an input signal, a reference voltage generator producing a constant reference voltage, a comparator comparing the reference voltage with the output voltage of the second output voltage, a drive circuit responsive to the output voltage of the comparator for applying a control signal to the current controlling circuit, and a limiter which prevents the voltage at the first output terminal of the current controlling circuit from becoming lower than the reference voltage.

4 Claims, 7 Drawing Figures

ELECTRIC MOTOR CONTROL CIRCUIT

BACKGROUND OF THE INVENTION

This invention relates to an electric motor control circuit and more particularly a governor device capable of maintaining the rotational speed of a relatively small DC motor at a stable state against external disturbances.

As the governor device of a small DC motor has been used a device having a construction as shown in FIG. 1, which comprises a current controlling circuit 1 having two output terminals 2 and 7 and one input terminal 12A. The output terminal 2 is connected to terminal 4A of a source of supply 4 via a resistor 3 and to one end of a resistor 5 and the input terminal of a reference voltage generator 6. The other end of resistor 5 is connected to the output terminal 7 of current controlling circuit 1. The reference voltage generator 6 functions to always maintain the potential difference between input and output at a definite reference voltage $V_{ref}$, and its output terminal is connected to one input terminal 11 of a comparator 9.

Between the output terminal 7 of the current control circuit 1 and the source terminal 4A is connected a DC motor 8 to be controlled (hereinafter merely called a motor).

Another input terminal 10 of the comparator 9 is connected to the output terminal 7 of the current control circuit 1. The output terminal 9A of comparator 9 is connected to an input terminal of a driving circuit 12. The output terminal of the driving circuit 12 is connected to the input terminal 12A of the current controlling circuit 1. The comparator 9 compares with each other input voltages to input terminals 10 and 11 and supplies its result of comparison to the current controlling circuit 1 via a driving circuit 12.

The current controlling circuit 1 shown in FIG. 1 is set that the current outputted from output terminal 7 for driving motor 8 would always be K times of the current derived out from the output terminal 2. Where K is termed a current proportionality constant. Usually, it is set to about 16-50.

The current controlling circuit 1 has a construction as shown in FIG. 2 showing a case wherein the current proportionality constant K is set to 20. The base electrodes of aligned (K+1) transistors 13, 14 . . . 33 are commonly connected to the terminal 12A and the emitter electrodes of respective transistors 13-33 are connected to a point of reference potential respectively through emitter resistors 34-54. The collector electrode of transistor 13 is connected to the output terminal 2, while collector electrodes of transistors 14-33 are commonly connected to the output terminal 7. The output of the driving circuit 12 is applied to the commonly connected base electrodes via terminal 12A.

The circuit shown in FIG. 1 operates as follows. Under a steady state, the voltages of input terminals 11 and 10 of the comparator 9 are made to be equal by a feedback operation.

The voltage $V_M$ impressed upon the motor 8 is given by the following equation.

$$V_M = E_a + R_M I_M \quad (1)$$

where
$V_M$: voltage of motor 8

$E_a$: counter-electromotive force of motor 8 (proportional to the rotational speed of the motor 8)
$R_M$: internal resistance of the motor 8.
$I_M$: current flowing through the motor 8 (proportional to the load torque of the motor 8)

The current $I_2$ flowing through resistor 5 is given by the following equation.

$$I_2 = V_{ref}/R_5 \quad (2)$$

where
$I_2$: current flowing through resistor 5.
$V_{ref}$: voltage of reference voltage generator 6.
$R_5$: resistance value of resistor 5.

The voltage drop $V_T$ across resistor 3 is given by the following equation.

$$V_T = R_3(I_2 + I_2/K + I_M/K) \quad (3)$$

where
$V_T$: voltage drop across resistor 3
$R_3$: resistance value of resistor 3
K: current proportionality constant The resistance value $R_3$ of resistor 3 is selected to satisfy the following equation.

$$R_3 = K\, R_M \quad (4)$$

During the steady state, since the circuit operates to make equal the voltage applied to input terminals 10 and 11 of the comparator 9, the following equation holds.

$$V_T + V_{ref} = V_M \quad (5)$$

From equations (1)-(5) the following equation can be derived.

$$E_a = (1 + R_M/R_5 + K\, R_M/R_5) V_{ref} \quad (6)$$

Equation (6) shows that the counter-electromotive force $E_a$ proportional to the rotational speed of motor 8 is constant irrespective of current $I_M$ flowing through the motor 8. More particullarly, equation (6) shows that even when the load torque of motor 8 varies to vary the motor current $I_M$, the rotational speed of motor 8 can be maintained at a constant value, that is equation (6) shows the operational principle of a governor. It should be noted here that the resistance $R_5$ may be infinite by removing the resistor 5.

Equation (6) also shows that when the resistance value $R_5$ of resistor 5 is suitably selected with respect to the internal resistance $R_M$ inherent to the motor 8, the current proportionality constant K inherent to the governor and voltage $V_{ref}$ of the reference voltage generator 6, the rotational speed of the motor can be set to any desired value.

The operation of the prior art circuit shown in FIG. 1 at the time of closing a source switch is as follows.

More particularly, at the time and immediately after closure of the source switch, since the motor 8 does not rotate, no counter-electromotive force $E_a$ is generated. Consequently, the voltages at the output terminals 2 and 7 of the current control circuit 1 are equal. On the other hand, voltage of the input terminal 11 of comparator 9 is lower than that at the input terminal 10 because the input terminal 11 is connected to the reference voltage generator 6. The comparator 9 strongly drives the current control circuit 1 via driving circuit 12 in accordance with the magnitude of the difference voltage described above, thereby generating a desired starting torque.

However, with the prior art circuit shown in FIG. 1 it was impossible to make large the driving power of the driving circuit 12 which is necessary for increasing the starting torque. This is because the driving power of the circuit 12 should be designed so small that the difference between the output voltage $V_1$ at the output terminal 2 of the current controlling circuit 1 and the voltage $V_2$ of the output terminal 7 become the same or larger than the reference voltage $V_{ref}$ produced by the reference voltage generator 6 in order to smoothly reach the steady state, whereas when the power of the driving circuit 12 is large, the voltage $V_1$ at the output terminal 2 of the current controlling circuit 1 would become lower than the reference voltage $V_{ref}$ with the result that the reference voltage generator 6 fails to supply the normal reference voltage $V_{ref}$, accordingly the comparing operation of the comparator 9 is not performed normally and an excessive current flows into the motor 8. Thereafter, the comparator 9 operates to decrease the output of the driving circuit 12 for passing desired current through motor 8. The control characteristic of the motor 8 under such state is shown in FIG. 3 showing that a unstable range appears in which the motor speed becomes higher than a normal speed before it becomes a constant or steady value. For this reason in the prior art circuit shown in FIG. 1 it is impossible to make large the starting torque even when the maximum power of the driving circuit 12 is made sufficiently large.

To obviate this problem it has been proposed a circuit in which an operating bias voltage of the reference voltage generator 6 is supplied from the output terminal 2 of the current controlling circuit 1 and an operating bias voltage for the comparator 9 and the driving circuit 12 is supplied by utilizing the voltage of the reference voltage generator 6. With this construction the driving circuit 12 will be driven strongly so that the current flowing to the output terminals 2 and 7 would become large thus decreasing the voltage of the output terminal 2. Thus, when this voltage tends to become lower than the reference voltage $V_{ref}$ at the steady conditions, the output of the driving circuit 12 also decreases so that the output voltage at the output terminal 2 of the current control circuit 1 would not decrease below the reference voltage $V_{ref}$ thus preventing unstable operation. The only merit of this method, however, is to automatically limit the power of the driving circuit 12, thus failing to obtain sufficiently large starting torque at the time of starting. The control characteristic of this method is shown in FIG. 4.

SUMMARY OF THE INVENTION

An object of this invention is to provide a novel motor control circuit having a large starting torque at the time of starting the motor as well as a stable control characteristic.

According to this invention there is provided a motor control circuit comprising a source terminal; a first current path including a resistor; a second current path including a motor to be controlled; a current controlling circuit having a first output terminal connected to the source terminal through the first current path, a second output terminal connected to the source terminal through the second current path, and an input terminal, currents outputted from the first and second output terminals being controlled by an input signal supplied to the input terminal; a reference voltage generator with its input terminal connected to the first output terminal of the current controlling circuit for maintaining voltage between the input and output terminals of the reference voltage generator at a predetermined reference voltage; a comparator with one input terminal connected to the output terminal of the reference voltage generator and the other input terminal connected to the second output terminal of the current controlling circuit for comparing the voltages supplied to the two input terminals to produce a result of comparison signal; a driving circuit connected to receive the result of comparison signal for supplying a control signal to the input terminal of the current controlling circuit; and limiter means for preventing the voltage at the first output terminal of the current controlling circuit from becoming lower than the reference voltage.

DESCRIPTION OF THE PREFERRED EMBODIMENT

Figure 1:
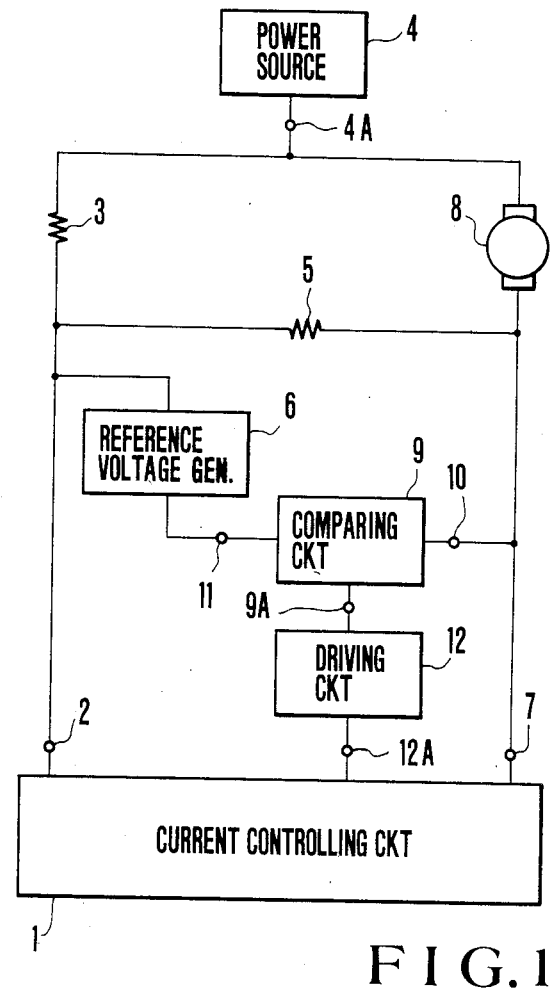
FIG. 1 is a block diagram showing one example of the construction of a prior art governor device.
Figure 2:
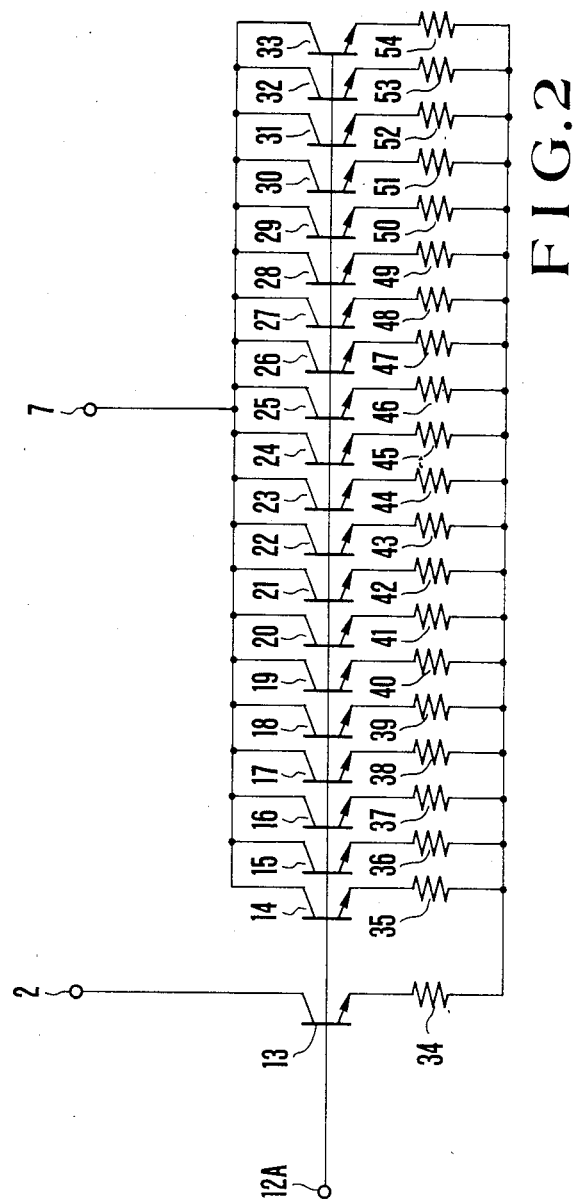
FIG. 2 is a connection diagram showing one example of the current controlling circuit utilized in the governor device shown in FIG. 1.
Figure 3:
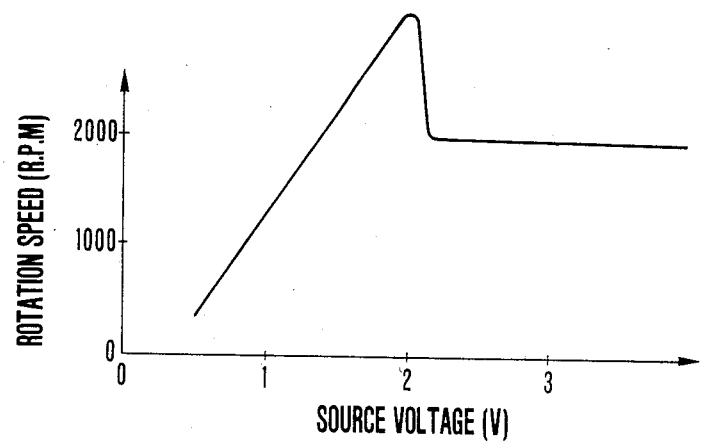
FIG. 3 shows one example of the control characteristic of the prior art governor.
Figure 4:
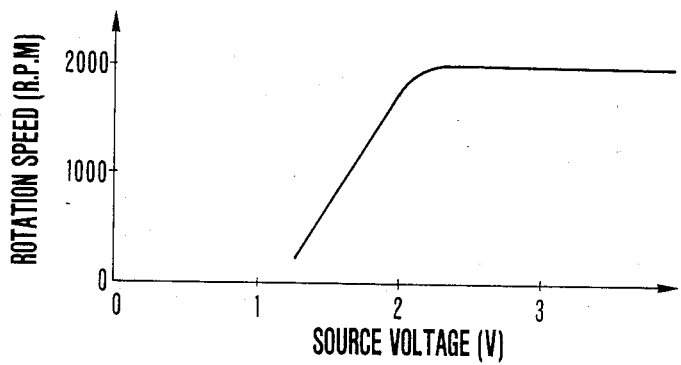
FIG. 4 shows one example of the control characteristic of another prior art governor.
Figure 5:
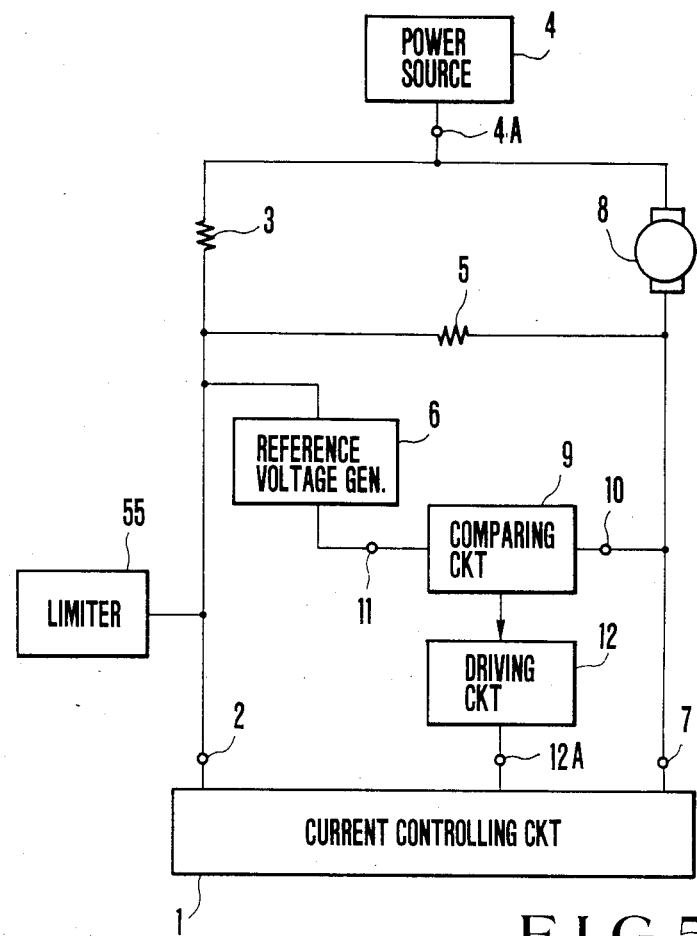
FIG. 5 is a block diagram showing the construction of the governor device according to the preferred embodiment of the invention.

The embodiment of this invention shown in FIG. 5 comprises a current controlling circuit 1, a resistor 3, a source 4, a resistor 5, a reference voltage generator 6, a DC motor 8, a comparator 9 and a driving circuit 12 which are identical to those shown in FIGS. 1 and 2. A limiter 55 is connected to the ouput terminal 2 of the current controlling circuit 1. The purpose of the limiter 55 is to prevent the voltage at the output terminal 2 of the current controlling circuit 1 from becoming lower than the reference voltage $V_{ref}$ produced by the reference voltage generator 6.

Figure 6:
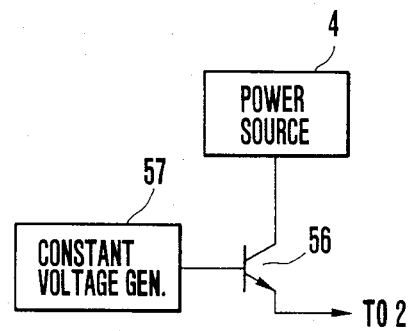
FIG. 6 is a block diagram showing the limiter circuit utilized in the embodiment shown in FIG. 5.

The limiter 55 has a construction as shown in FIG. 6 in which the collector electrode of a transistor 56 is connected to source 4, base electrode is connected to a constant voltage generator 57, and the emitter electrode constitutes for the output terminal 2 of the limiter 55 and is connected to the output terminal 2 of the current controlling circuit 1. The voltage $V_{ref-2}$ of the constant voltage generator 57 is set to be higher than the reference voltage $V_{ref}$ produced by the reference voltage generator 6 by the forward voltage $V_{BE}$ between the base and emitter electrodes of transistor 56. Thus the following equation holds $$V_{ref-2} = V_{ref} + V_{BE} \tag{7}$$

For example, the voltage $V_{ref-2}$ is about 2.0 volts when the reference voltage $V_{ref}$ of the reference voltage generator 6 is about 1.3 volts.

Since the governor device of this invention has a construction described above, during the steady condition in which the voltage at the output terminal 2 of the current controlling circuit 1 is higher than the reference voltage $V_{ref}$ produced by the reference voltage generator 6, the governor device operates just in the same manner as the prior art governor shown in FIG. 1.

Figure 7:
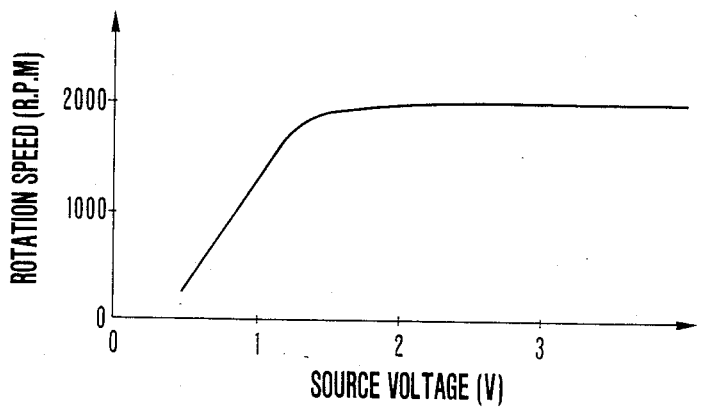
FIG. 7 shows the control characteristic of the governor according to the preferred embodiment of the invention.

Upon closure of the source switch since the limiter circuit 55 prevents the voltage at the output terminal 2 of the current controlling circuit 1 from decreasing below the reference voltage $V_{ref}$, the comparator 9 operates normally and the reference voltage generator 6 constantly supply the stable reference voltage $V_{ref}$. Accordingly the driving circuit 12 can always drive the current controlling circuit 1 with a sufficiently large power so that even when the motor 8 is started with a large starting torque, its speed can stably reach the stable state. The control characteristic of this governor device is shown in FIG. 7. As shown, current is supplied to the motor sufficient to produce a large starting torque and the motor rotates stably until the steady state is reached.

In the above described embodiment the resistor 5 is connected between the output terminal 2 and 7 of the current controlling circuit 1, however, it should be noted that the resistor 5 is not essential with respect to the invention. That is, another embodiment without the resistor 5 is considered wherein the constant rotational speed of the motor 8 satisfying the condition $E_a = V_{ref}$ is obtained, as is apparent from the equation (6).

As above described, according to this invention, it is possible to provide a governor device having a large starting torque and a stable control characteristic. Furthermore, as shown in FIG. 7, it is possible to maintain stable the speed of the motor even with a low source voltage.

What is claimed is:
1. A motor control circuit comprising
a source terminal;
a first current path including a resistor;
a second current path including a motor to be controlled;
a current controlling circuit having a first output terminal connected to said source terminal through said first current path, a second output terminal connected to said source terminal through said second current path, and an input terminal, currents outputted from said first and second output terminal being controlled by an input signal supplied to said input terminal;
a reference voltage generator with its input terminal connected to said first output terminal of said current controlling circuit for maintaining voltage between input and output terminals of said reference voltage generator at a predetermined reference voltage;
a comparing circuit with one input terminal connected to the output terminal of said reference voltage generator and the other input terminal connected to said second output terminal of said current controlling circuit for comparing voltages supplied to said two input terminals to produce a result of comparison signal;
a driving circuit connected to receive said result of comparison signal for supplying a control signal to said input terminal of said current controlling circuit;
a constant voltage generator provided independently of said reference voltage generator and generating a constant voltage at its output terminal;
a limiter means coupled between the output terminal of said constant voltage generator and said first output terminal of said current controlling circuit for preventing voltage at said first output terminal of said current controlling circuit from becoming lower than said reference voltage in response to said constant voltage generated by said constant voltage generator and the voltage at said first output terminal of said current controlling circuit, the voltage at said first output terminal of said current controlling circuit being limited, when a source voltage starts to be applied to said source terminal, to a level larger than said reference voltage and smaller than a steady voltage at said first output terminal of said current controlling circuit.

2. The motor control circuit according to claim 1 wherein another resistor is connected between said first and second output terminals of said current controlling circuit.

3. The motor control circuit according to claim 1 wherein said limiter means comprises a transistor having a collector electrode connected to said source terminal, a base electrode connected to the output terminal of said constant voltage generator, and an emitter electrode connected to the first output terminal of said current controlling circuit, and said constant voltage generator generates the constant voltage larger than said reference voltage by a base-emitter voltage of said transistor.

4. The motor control circuit according to claim 1 wherein said resistor included in said first current path has a resistance value K times of a internal current resistance of said motor where K represents a positive integer.

* * * * *